United States Patent Office 2,975,215
Patented Mar. 14, 1961

2,975,215

PROCESS FOR THE PRODUCTION OF HIGHER BORON ALKYLS FROM BORON ALKYLS OF LOWER MOLECULAR WEIGHT

Karl Ziegler and Roland Köster, Mulheim-Ruhr, and Wolf-Rainer Kroll, Witten-Anne, Germany, assignors to Karl Ziegler, Mulheim-Ruhr, Germany No Drawing. Filed Jan. 12, 1959, Ser. No. 786,032

Claims priority, application Germany Jan. 13, 1958

9 Claims. (Cl. 260—606.5)

This invention relates to a process for the production of higher boron alkyls and derivatives thereof from boron alkyls of lower molecular weight.

It is known that aluminium trialkyls, for example aluminium triethyl, are converted into higher aluminium alkyls under the action of ethylene at temperatures in the region of 100° C., the average molecular weight of the alkyl groups attached to the aluminium atom in the reaction products depending on the mol ratio of the aluminium alkyl to the ethylene employed. Boron alkyls do not undergo this reaction under similar conditions.

It has now been found that boron alkyls can also be converted in a quite similar manner into higher homologues if ethylene is caused to act upon them in the presence of small quantities of aluminium trialkyls, which act as catalysts. It is also possible to use small quantities of aluminium dialkyl hydrides or aluminium hydride itself instead of aluminium trialkyls, since both are converted into aluminium trialkyls during the reaction with ethylene.

According to the present invention, therefore, there is provided a process for the production of higher boron alkyls from boron alkyls of lower molecular weight, wherein boron alkyls are reacted with ethylene in the presence of aluminium trialkyls. It is advisable to effect the reaction at temperatures between 90 and 250° C., and most advantageously between 120 and 200° C. The ethylene is most suitably introduced at superatmospheric pressure and, when working at the lower end of the temperature ranges mentioned above, at pressure exceeding 20 atm., and preferably exceeding 100 atm. No upper limits are set for the ethylene pressure, but it is not necessary in any case to use a pressure substantially higher than 200 atm. If temperatures exceeding about 170° C. are employed, it is also possible to use ethylene at lower pressures, but under such conditions higher olefines are also formed as secondary products.

The boron alkyls produced by the process according to the invention are not homogeneous compounds, but statistical mixtures. For example, when starting with boron triethyl and allowing a total of 6 mols of ethylene to act upon 1 mol thereof, the resulting reaction product is obtained, in addition to a small quantity of unreacted ethylene, and contains butyl, hexyl, octyl, decyl, dodecyl, tetradecyl and some even higher radicals bonded to the boron atom.

The aluminium trialkyls required as catalysts in accordance with the invention are effective even in very small quantities. When determining the quantity of catalyst to be added, it is however, necessary to bear in mind the following: boron trialkyls are air-sensitive and, by absorbing oxygen, they change first of all into dialkyl boric acid esters. Consequently, a boron trialkyl preparation, for example boron triethyl, is obtained, usually with some of the corresponding dialkyl boric acid ester, for example diethyl boric acid ethyl ester $(C_2H_5)_2BOC_2H_5$, arising from certain insufficiencies in the production. These dialkyl boric acid esters react with aluminium trialkyls, for example aluminium triethyl, in accordance with the following equation:

$(C_2H_5)_2BOC_2H_5 + Al(C_2H_5)_3$
$= B(C_2H_5)_3 + (C_2H_5)_2AlOC_2H_5$

The dialkyl ethoxy aluminium formed does not catalyze the desired reaction of ethylene with boron trialkyls. Consequently, somewhat more aluminium trialkyl is preferably always used as catalysts than corresponds to that proportion of dialkyl boric acid ester which may be present in the boron trialkyl. This excess in any case need only be very slight and 1% is quite sufficient. It is, however, also possible to use up to 5 or 10% excess, whereby the reaction according to the invention is considerably accelerated.

The reaction products can be freed very easily from the catalyst fractions by treatment with cold water, which in certain circumstances is slightly acidified, with the exclusion of air. In this way, only the aluminium trialkyls are destroyed, while the boron trialkyls remain unchanged.

The boron alkyls produced according to the process of the invention can be used as intermediates for the production of valuable additional substances, for example by careful oxidation, for instance with gases containing only a small quantity of oxygen, they can be converted into dialkyl boric acid esters, and by stronger oxidation, for instance with pure oxygen, they are converted towards the end of the oxidation into monoalkyl boric acid esters.

It is possible to obtain the corresponding dialkyl and monoalkyl boric acids therefrom by saponification as well as the corresponding fatty alcohols. Conversion into alkyl boric acids is also possible by heating the boron trialkyls produced according to the invention to relatively high temperatures with boric acid esters by the process of patent specification No. 1,061,781. (German patent application St. 11905 IVb/12o).

The following examples further illustrate the invention:

Example 1

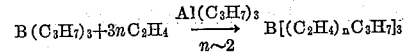

40 g. (0.285 mol) of boron tri-n-propyl and, as catalyst, 3.2 g. (0.0205 mol.) of aluminium tri-n-propyl are placed in a 200 cc. autoclave in an atmosphere of nitrogen. 50 g. (1.78 mols) of ethylene are introduced under pressure and the autoclave is heated to about 90° C. while shaking (pressure about 250 atm.). The pressure then falls slowly. By further raising the temperature to 150–160° C., the pressure drop is very much more rapid and finally reaches a constant value (18 atm. at 150° C.) after a reaction period of 7 hours altogether. After cooling and blowing off the gases (about 4 g. of propane with a small quantity of but-1-ene, 88 g. of a colourless liquid are obtained when the autoclave is emptied. The liquid which is obtained after decomposition of the catalyst with dilute acid whilst air is excluded, consists of a mixture of higher boron trialkyls with about 25 g. of mainly unbranched α-olefines.

After distilling off the readily volatile olefines, the recovered boron alkyls have a boron content of 3.5% B, which corresponds to a mean molecular weight of about 300. The mixture of long-chain boron alkyls can be distilled under reduced pressure.

Example 2

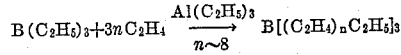

44 g. (0.45 mol) of boron triethyl together with 5 g. (0.044 mol) of aluminium triethyl are placed in a 1 litre autoclave under nitrogen. 300 g. (11.8 mols) of ethylene are forced in and the autoclave is heated while shaking to 160–170° C. The pressure falls within 4 hours to about 20 atm. (at 160° C.). After blowing off the gases, (about 10 g. of ethylene and some n-but-1-ene), 340 g. of a colourless liquid are obtained when the autoclave is emptied. After decomposing the catalyst with approximately 100 cc. of dilute sulphuric acid whilst excluding air, the organic boron layer is separated. A mixture of higher boron alkyls with a boron content of 2.4%, i.e. a mean molecular weight of 440 is obtained. (Calculated for boron tri-n-decyl=2.5% B.)

*Example 3*

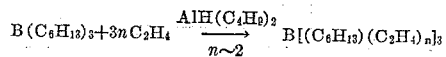

56 g. of ethylene (2.0 mols) are forced into a 500 cc. autoclave containing 91.0 g. (0.34 mol) of boron tri-n-hexyl (B.P.$_{0.1\ mm.\ Hg}$=99–100° C.) and 5 g. of aluminium di-n-butyl hydride in an atmosphere of nitrogen. The autoclave is quickly heated to 130 to 140° C., the elevated pressure completely disappearing within 2 hours. After cooling, the contents of the autoclave are treated with dilute sulphuric acid to decompose the catalyst. The organic boron layer is then separated whilst air is excluded. A colourless liquid with a boron content of 2.5% (corresponding to boron tri-n-decyl) and a molecular weight of 420 is obtained. The compound is decomposed at relatively high temperatures (and more especially on distillation under high vacuum) into boron n-decyl hydrides and dec-1-ene, which combine again at low temperature to form boron tri-n-decyl.

*Example 4*

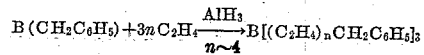

28.4 g. (0.1 mol) of boron tribenzyl (3.8% B) are placed, together with a suspension of 1 g. (0.033 mol) of aluminium hydride in 50 cc. of pentane, in a 250 cc. autoclave under an atmosphere of nitrogen. 35 g. (1.2 mols) of ethylene are forced in under pressure and the autoclave is slowly heated to 150° C. while shaking well. In the course of 5 hours the pressure falls to 30 atm. (at 150° C.). After cooling and blowing off unreacted ethylene (about 5 g.) the discharged liquid is treated, with the exclusion of air, with 100 cc. of water.

After separating the aqueous layer, a solution of higher boron trialkyls in pentane is obtained. After evaporating the solvent, 50 g. of a viscous liquid (2.1% B, i.e. mean molecular weight about 500) are recovered.

*Example 5*

A colourless liquid which slowly solidifies at room temperature after working up is obtained from 42 g. (0.1 mol) of boron tri-n-decyl, to which 4 g. of aluminium triethyl are added, after reaction with 17 g. (0.6 mol) of ethylene in accordance with the procedure of Example 3. The boron content of the compound corresponds to boron trihexadecyl. Its melting point is 26–27° C.

We claim:

1. Process for the production of higher boron alkyls and derivatives thereof from boron alkyls of low molecular weight, which comprises reacting a boron alkyl with ethylene in the presence of a compound selected from the group consisting of aluminium trialkyls, aluminium dialkyl hydrides and aluminium hydride.

2. Process as claimed in claim 1, wherein the reaction is carried out at a temperature between 90 and 250° C.

3. Process as claimed in claim 2, wherein the reaction is carried out at a temperature between 120 and 200° C.

4. Process as claimed in claim 1, wherein the ethylene is introduced under superatmospheric pressure.

5. Process as claimed in claim 4, wherein the ethylene is introduced at a pressure exceeding 20 atmospheres.

6. Process as claimed in claim 5, wherein the ethylene is introduced at a pressure exceeding 100 atmospheres.

7. Process as claimed in claim 1, wherein a small excess of aluminium trialkyl over that which corresponds to any dialkyl boric acid ester present in the boron trialkyl is added to the boron trialkyl.

8. Process as claimed in claim 1, wherein from 1 to 10% of an aluminium trialkyl is added to the boron trialkyl.

9. Process as claimed in claim 1, wherein the products of the reaction are treated with cold water with the exclusion of air.

References Cited in the file of this patent

Johnson et al.: J. Am. Chem. Soc., vol. 60, pp. 121–4 (1938). (Copy in Scientific Library.)

Mikhailov et al.: Chem. Abs., vol. 52, pp. 17148 (Oct. 25, 1958).